US012802256B2

(12) United States Patent
Jiang et al.

(10) Patent No.: US 12,802,256 B2
(45) Date of Patent: Nov. 17, 2026

(54) AUGMENTED SELECTIVE OBJECT RENDERING ON VISUAL ENHANCEMENT DEVICES

(71) Applicant: INTERNATIONAL BUSINESS MACHINES CORPORATION, Armonk, NY (US)

(72) Inventors: Peng Hui Jiang, Beijing (CN); Yang Liang, Beijing (CN); Terry James Hoffman, Austin, TX (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 18/117,742

(22) Filed: Mar. 6, 2023

(65) Prior Publication Data

US 2024/0303851 A1 Sep. 12, 2024

(51) Int. Cl.

| | |
|---|---|
| ***G06T 7/70*** | (2017.01) |
| ***G06F 3/14*** | (2006.01) |
| ***G06T 5/77*** | (2024.01) |
| ***G06V 10/764*** | (2022.01) |

(52) U.S. Cl.
CPC .................. *G06T 7/70* (2017.01); *G06F 3/14* (2013.01); *G06T 5/77* (2024.01); *G06V 10/764* (2022.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 9,753,312 | B2 | 9/2017 | Moore | |
| 10,395,416 | B2 | 8/2019 | Bakalash | |
| 10,586,360 | B2 | 3/2020 | DeLuca et al. | |
| 11,145,097 | B2 | 10/2021 | DeLuca et al. | |
| 2006/0262140 | A1 | 11/2006 | Kujawa et al. | |
| 2015/0110413 | A1 * | 4/2015 | Eronen ................ | H04N 5/2621 382/254 |

(Continued)

FOREIGN PATENT DOCUMENTS

| | | |
|---|---|---|
| WO | 2012109182 | 8/2012 |

OTHER PUBLICATIONS

Lee et al., "Predicting Important Objects for Egocentric Video Summarization," Int J Comput Vis (2015) 114:38-55 (Year: 2015).*

(Continued)

*Primary Examiner* — Soo Shin
(74) *Attorney, Agent, or Firm* — Seed Intellectual Property Law Group LLP

(57) ABSTRACT

A method includes: receiving, by a processor set, context data from one or more Internet of Things (IoT) sensors; identifying, by the processor set, one or more objects in a frame of a video stream, thereby determining identified objects; classifying, by the processor set, the identified objects, thereby determining classified objects; prioritizing, by the processor set, the classified objects using the context data, thereby determining prioritized objects; selecting, by the processor set, an object from the prioritized objects; enhancing, by the processor set, the frame of the video stream based on the selected object; and rendering, by the processor set, the enhanced frame on a display of a visual enhancement device.

18 Claims, 10 Drawing Sheets

(56) References Cited

U.S. PATENT DOCUMENTS

| | | | |
|---|---|---|---|
| 2019/0238648 A1 | 8/2019 | Goel et al. | |
| 2020/0304887 A1 | 9/2020 | Baughman et al. | |
| 2021/0183155 A1 | 6/2021 | Ellenby | |
| 2021/0373650 A1 | 12/2021 | Kang et al. | |
| 2023/0058036 A1* | 2/2023 | Sachdeva | G06T 19/006 |

OTHER PUBLICATIONS

Sun et al., "Ranking Domain-Specific Highlights by Analyzing Edited Videos," D. Fleet et al. (Eds.): ECCV 2014, Part I, LNCS 8689, pp. 787-802, 2014. (Year: 2014).*
Dommaraju, "Analysis of Deep Learning-based Object Detection", https://monica-dommaraju.medium.com/analysis-of-deep-learning-based-object-detection-f14d5138148, May 16, 2020, 11 pages.
Mattoo, "Object Recognition: Widening the Horizon of Computer Vision", https://www.g2.com/articles/object-recognition, Jun. 29, 2022, 16 pages.
Ahmadyan et al., "Real-Time 3D Object Detection on Mobile Devices with MediaPipe", https://ai.googleblog.com/2020/03/real-time-3d-object detection-on-mobile.html, Mar. 11, 2020, 7 pages.
Zhang et al., "Detecting Objects from No. Object Regions: A Context-Based Data Augmentation for Object Detection", Atlantis Press, International Journal of Computational Intelligence Systems, Jun. 28, 2021, 9 pages.
Anonymous, "Highlighted Product Preference using AR", https://ip.com/IPCOM/000215836, Mar. 13, 2012, 2 pages.
Zia Yusuf et al., "Unleashing the Power of Data with loT and Augmented Reality", https://www.bcg.com/publications/2020/unleashing-the-power-of-data-with-iot-and-augmented reality, Mar. 13, 2020, 27 pages.
Wayback Machine, "Watson Visual Recognition: Pricing", https://www.ibm.com/no-en/cloud/watson-visual-recognition/pricing, archive date Jan. 12, 2023, 3 pages.
PCT International Search Report for International Application No. PCT/IB2024/052043, dated May 22, 2024, 10 pages.

* cited by examiner

800

| 801 | 802 | 803 | 804 | 805 | 806 | 807 | 808 | 809 | 810 | 811 | 812 | 813 |
|---|---|---|---|---|---|---|---|---|---|---|---|---|
| Time Stamp | Stream ID | Frame ID | Object ID | Object Type | Object Position List | Object Temperature | Environment Temperature | Wind Direction | Wind Speed | Location | Activity | Priority Score (0~10) |
| 10:10 pm | NULL | NULL | NULL | NULL | NULL | NULL | NULL | NULL | NULL | NULL | NULL | NULL |
| 10:11 pm | NULL | NULL | NULL | NULL | NULL | NULL | NULL | NULL | NULL | Ranch, Hutto, TX, 78734 | Wildlife observing | NULL |
| 10:20:23 pm | S0001 | FM1101 | Object-1 | Coyote | head (x1, y1), tail (x2,y2) | 35.6 ° C | 15.6 ° C | ESE | 5 km/h | Ranch, Hutto, TX, 78734 | Wildlife observing | NULL |
| 10:20:23 pm | S0001 | FM1101 | Object-2 | Cow | head (x3, y3), tail (x4,y4) | 36.6 ° C | 15.6 ° C | ESE | 5 km/h | Ranch, Hutto, TX, 78734 | Wildlife observing | NULL |
| ... | | | | | | | | | | | | |
| 10:20:24 pm | S0001 | FM1202 | Object-1 | Coyote | head (x1', y1'), tail (x2',y2') | 35.6 ° C | 15.0 ° C | ESE | 6 km/h | Ranch, Hutto, TX, 78734 | Wildlife observing | 10 |
| 10:20:24 pm | S0001 | FM1202 | Object-2 | Cow | head (x3, y3), tail (x4,y4) | 36.6 ° C | 15.0 ° C | ESE | 6 km/h | Ranch, Hutto, TX, 78734 | Wildlife observing | 5 |

FIG. 8

900

| 901 Time Stamp | 902 Stream ID | 903 Frame ID | 904 ObjectID | 905 Object Type | 906 Object Position List | 907 Object Temperature | 908 Environment Temperature | 909 Wind Direction | 910 Wind Speed | 911 Location | 912 Activity | 913 Priority Score (0~10) |
|---|---|---|---|---|---|---|---|---|---|---|---|---|
| 10:10 am | NULL | NULL | NULL | NULL | NULL | NULL | NULL | NULL | NULL | NULL | NULL | NULL |
| 10:11 am | NULL | NULL | NULL | NULL | NULL | NULL | NULL | NULL | NULL | NULL | NULL | NULL |
| 10:20:23 am | S0006 | FM8101 | Object-1 | animal | top (x1, y1), bottom (x2,y2) | NULL | NULL | NULL | NULL | Animal Checking Station | Temperature Screening | NULL |
| 10:20:23 am | S0006 | FM8101 | Object-2 | animal | top (x3, y3), bottom (x4,y4) | NULL | NULL | NULL | NULL | Animal Checking Station | Temperature Screening | NULL |
| ... | | | | | | | | | | | | |
| 10:20:24 am | S0006 | FM8201 | Object-1 | animal | top (x1, y1), bottom (x2,y2) | 37.6 ° C | 25.6 ° C | NULL | NULL | Animal Checking Station | Temperature Screening | 10 |
| 10:20:24 am | S0006 | FM8201 | Object-2 | animal | top (x3, y3), bottom (x4,y4) | 36.3 ° C | 25.6 ° C | NULL | NULL | Animal Checking Station | Temperature Screening | 5 |

FIG. 9

AUGMENTED SELECTIVE OBJECT RENDERING ON VISUAL ENHANCEMENT DEVICES

BACKGROUND

Aspects of the present invention relate generally to visual enhancement devices and, more particularly, to augmented selective object rendering (ASOR) on visual enhancement devices.

Visual enhancement devices electronically render a visual display that is viewed by a user. Examples include night vision goggles that utilize virtual reality (VR) or augmented reality (AR), displays used in closed-circuit television (CCTV) systems, and displays used in digital cameras.

Some visual enhancement devices are capable of performing object detection in the visual display that is rendered for the user. For example, visual enhancement devices may utilize a you only look once (YOLO) object detection algorithm to detect objects in a video stream in real time or in post processing. Other visual enhancement devices are capable of highlighting objects and hiding objects in the visual display that is rendered for the user. For example, devices may augment optically captured images with computer-generated graphics to form compound images in which a detected object is highlighted or hidden in the visual display that is rendered for the user. However, current devices suffer from the drawback of not being able to intelligently determine from surrounding context data which one of plural detected objects in a visual display is the most important object to a user. As such, although current devices can detect and highlight objects in the visual display, these current devices cannot do so in a manner that highlights an object that is contextually determined to be the most important object to a user viewing the visual display.

SUMMARY

In a first aspect of the invention, there is a computer-implemented method including: receiving, by a processor set, context data from one or more Internet of Things (IoT) sensors; identifying, by the processor set, one or more objects in a frame of a video stream, thereby determining identified objects; classifying, by the processor set, the identified objects, thereby determining classified objects; prioritizing, by the processor set, the classified objects using the context data, thereby determining prioritized objects; selecting, by the processor set, an object from the prioritized objects; enhancing, by the processor set, the frame of the video stream based on the selected object; and rendering, by the processor set, the enhanced frame on a display of a visual enhancement device. Implementations of the method advantageously use context data from one or more Internet of Things (IoT) sensors for determining how to modify a visual display of a visual enhancement device to highlight a most important object in the display. The prioritizing may be based on criteria defined by a user. The prioritizing may additionally be based on one or more object types defined by the user. In this manner, the prioritizing provides the advantage of determining an object in the frame that is most important to the user.

In another aspect of the invention, there is a computer program product including one or more computer readable storage media having program instructions collectively stored on the one or more computer readable storage media. The program instructions are executable to: receive context data from one or more Internet of Things (IoT) sensors; identify one or more objects in a frame of a video stream, thereby determining identified objects; classify the identified objects, thereby determining classified objects; prioritize the classified objects using the context data, thereby determining prioritized objects; select an object from the prioritized objects; enhance the frame of the video stream based on the selected object; and render the enhanced frame on a display of a visual enhancement device. Implementations of the computer program product advantageously use context data from one or more Internet of Things (IoT) sensors for determining how to modify a visual display of a visual enhancement device to highlight a most important object in the display. The prioritizing may be based on criteria defined by a user. The prioritizing may additionally be based on one or more object types defined by the user. In this manner, the prioritizing provides the advantage of determining an object in the frame that is most important to the user.

In another aspect of the invention, there is system including a processor set, one or more computer readable storage media, and program instructions collectively stored on the one or more computer readable storage media. The program instructions are executable to: receive video data from a visual enhancement device; receive context data from one or more Internet of Things (IoT) sensors; identify one or more objects in a frame of a video stream of the video data, thereby determining identified objects; classify the identified objects, thereby determining classified objects; prioritize the classified objects using the context data, thereby determining prioritized objects; select an object from the prioritized objects; and transmit data defining the selected object to the visual enhancement device. In this manner, a server may provide the visual enhancement device with the data on which the enhancing and rendering will be based when the enhancing and rendering are performed by the visual enhancement device. The prioritizing may be based on a combination of user input and the context data. In this manner, the prioritizing provides the advantage of determining an object in the frame that is most important to the user.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIGS. 8 and 9 show examples of data structures in accordance with aspects of the invention.

DETAILED DESCRIPTION

Figure 1:
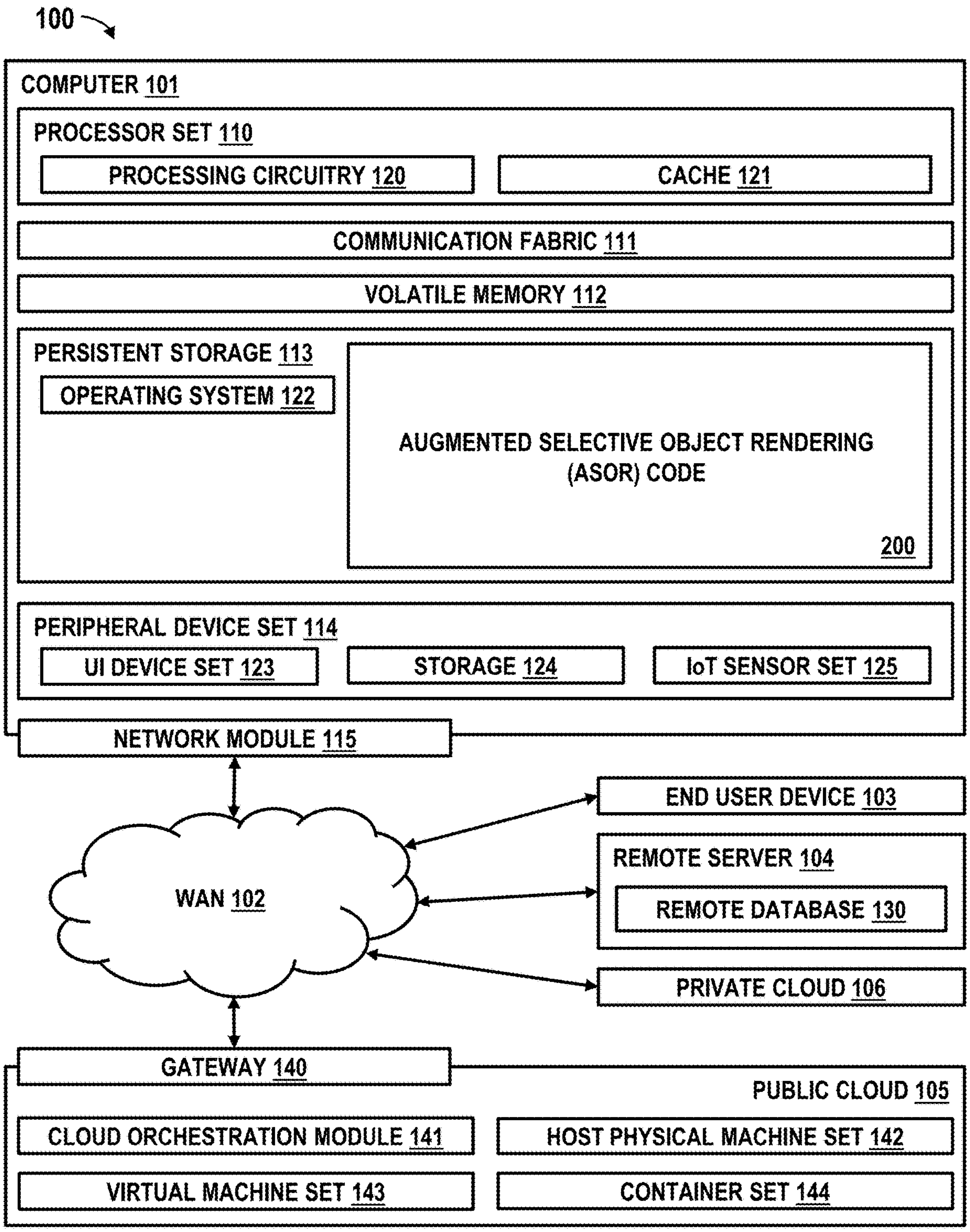
FIG. 1 depicts a computing environment according to an embodiment of the present invention.

Aspects of the present invention relate generally to visual enhancement devices and, more particularly, to augmented selective object rendering (ASOR) on visual enhancement devices. Embodiments of the invention intelligently determine from surrounding context data which one of plural detected objects in a visual display is the most important object to a user and then highlight that most important object (and/or hide other objects) in the visual display that is rendered for the user. Embodiments of the invention utilize context data gathered from one or more Internet of Things (IoT) devices (e.g., sensors) in determining the most important object to the user. In this manner, implementations of the invention utilize IoT device data as context data for determining how to modify a visual display of a visual enhancement device to highlight a most important object.

Implementations of the invention provide a technical solution to the technical problem of visual enhancement devices that do not intelligently determine from surrounding context data which one of plural detected objects in a visual display is the most important object to a user. In embodiments, the technical solution includes obtaining data from IoT sensors and utilizing the IoT device data as context data for determining the most important object, and then rendering a display of the visual enhancement devices to highlight the determined most important object and/or hide other objects.

Implementations of the invention have a practical application of affecting the rendering of a display of a visual enhancement device and, thus, causing the visual enhancement device to display a visual image that is enhanced based on context data derived from IoT sensors. The rendering and displaying of the enhanced visual image affect the physical state of the visual enhancement device. The rendering and displaying of the enhanced visual image are not extra-solution activity; rather, they represent aspects of the solution itself, i.e., enhancing the display of the visual enhancement device to highlight a determined most important object (and/or hide other objects) in the visual display that is rendered for the user.

In accordance with aspects described herein, there is a method of augmented selective object rendering (ASOR) on a visual enhancement device, the method including determining, rendering, and highlighting the most important object $O_i$ from multiple identified objects O ($O_1$, $O_2$, $O_3$, $O_i$, . . . $O_n$) in a visual enhancement device. In embodiments, the method includes collecting context data (e.g., location, purpose, temperature, video shooting direction, object type, object moving direction, etc.) from one or more IoT sensors in an IoT network. The collecting may be performed by an information collector module. In embodiments, the method includes identifying all objects O ($O_1$, $O_2$, $O_3$, $O_i$, . . . $O_n$) in the current frame. The identifying may be performed by an ASOR identifier module. In embodiments, the method includes determining object types (e.g., human, animals, moving, static, etc.) and classifying them according to predefined object types. The determining and classifying may be performed by an ASOR classifier module. In embodiments, the method includes prioritizing the identified objects O ($O_1$, $O_2$, $O_3$, $O_i$, . . . $O_n$) according to the classified object types. The prioritizing may be performed by an ASOR prioritizing module. In embodiments, the method includes selecting the object $O_i$ on the top of the prioritized objects. The selecting may be performed by an ASOR selector module. In embodiments, the method includes highlighting the top object $O_i$ of the prioritized objects and hiding the objects in lower prioritized objects. The highlighting may be performed by an ASOR filtering module. In embodiments, the method includes rendering the highlighted the objects in the current frame. The rendering may be performed by an ASOR rendering module.

The method may further include allowing users to define ASOR criteria and priorities of interested objects to be augmented. This may be accomplished using an ASOR manager module, a service profile, ASOR criteria, an ASOR data structure, and an interested object list.

The method may further include defining a framework to support the ASOR feature in a visual enhancement device. This may be accomplished using an ASOR server and an ASOR client.

The method may further include defining an ASOR data structure for saving and tracking a detected object and its attributes. The ASOR data structure may include data fields such as: Stream ID, Frame ID, Object ID, Object Type, Object Position List, Object Temperature, Environment Temperature, Wind Direction, Wind Speed, Time Stamp, Context (e.g., location, activities), and Priority Score.

It should be understood that, to the extent implementations of the invention collect, store, or employ personal information provided by, or obtained from, individuals (for example, location information), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as augmented selective object rendering (ASOR) code shown at block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
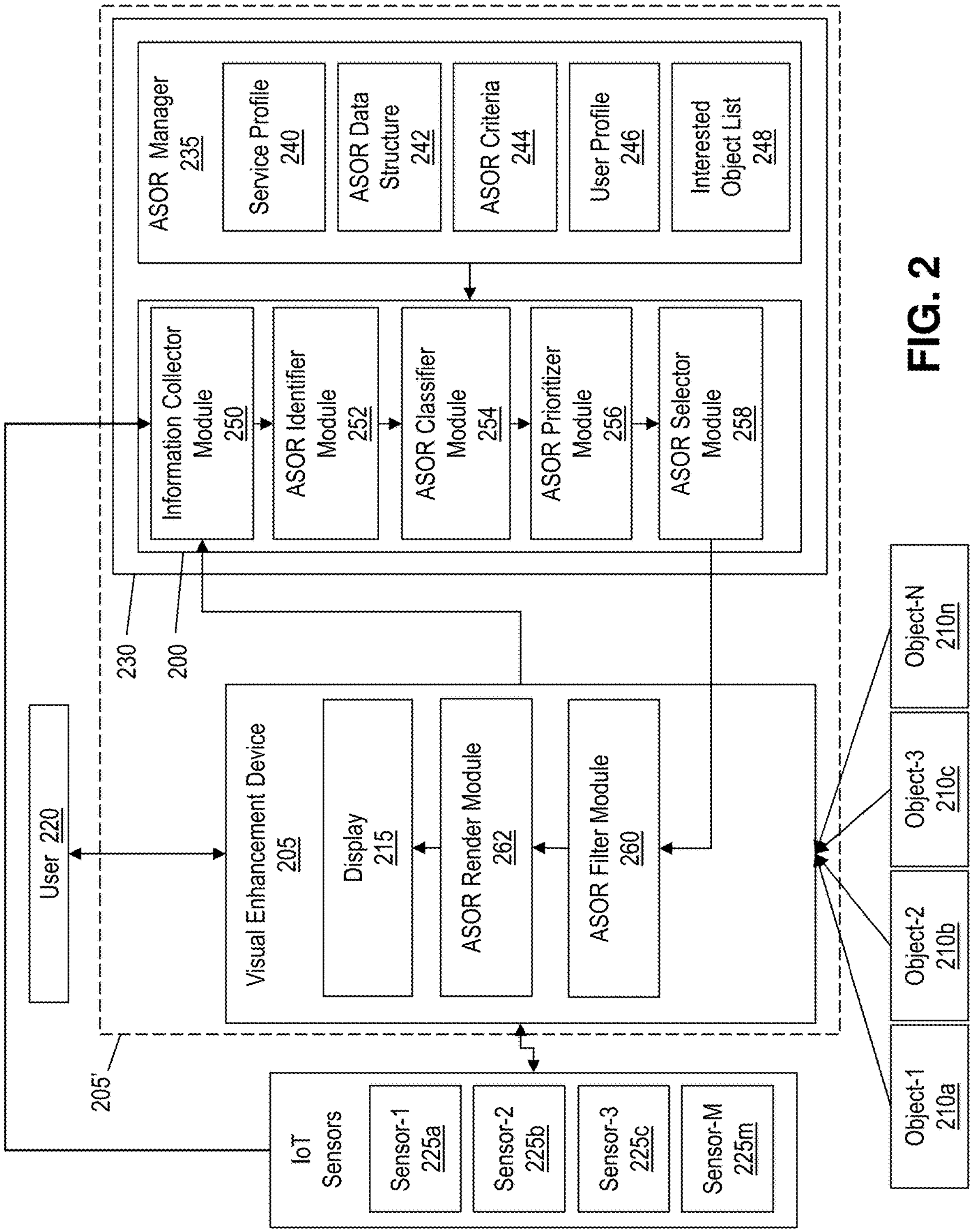
FIG. 2 shows a block diagram of an exemplary environment in accordance with aspects of the invention.

FIG. 2 shows a block diagram of an exemplary environment in accordance with aspects of the invention. In embodiments, the environment includes a visual enhancement device 205 that captures or receives visual images of real-world environments including one or more objects 210*a*, 210*b*, 210*c* . . . 210*n* and that outputs a display of the visual images on a display 215 that can be viewed (e.g., seen) by a user 220. The display 215 may comprise a liquid-crystal display (LCD) or light-emitting diode (LED) based display, for example. The visual enhancement device 205 may comprise, for example and without limitation, night vision goggles, a VR headset, an AR headset, a closed-circuit television (CCTV) system, or a digital camera. Implementations are not limited to these examples, and other types of visual enhancement devices and other types of display may be used.

The environment according to an implementation of the invention includes one or more IoT sensors 225*a*, 225*b*, 225*c*, . . . , 225*m* and an ASOR server 230. In one example, the ASOR server 230 comprises one or more instances of the computer 101 of FIG. 1. In another example, the ASOR server 230 comprises one or more virtual machines that may be running on one or more instances of the computer 101 of FIG. 1. In another example, the ASOR server 230 comprises one or more containers that may be running on one or more instances of the computer 101 of FIG. 1. In embodiments, the ASOR server 230 includes the ASOR code 200 of FIG. 1. According to aspects of the invention, the ASOR code 200 uses data from the IoT sensors 225*a-m* to enhance the displayed output of the display 215 of the visual enhancement device 205 by highlighting a determined most important one of the objects 210*a-n* in the displayed output and/or hiding other ones of the objects in the displayed output. In embodiments, the ASOR code 200 determines a most important one of the objects 210*a-n* using data from the IoT sensors 225*a-m* and data from an ASOR manager 235.

In embodiments, the ASOR manager 235 comprises a service profile 240, ASOR data structure 242, ASOR criteria 244, user profile 246, and interested object list 248, each of which comprises one or more data structures that store data used by the ASOR code 200 in the manner described herein.

In embodiments, the service profile 240 includes data that defines the data fields included in the ASOR data structure 242. The service profile 240 may be defined by an administrative user.

In embodiments, the ASOR data structure 242 includes data that describes attributes of each video frame of a video stream. The data may be used by the system for tracking detected objects and their related attributes throughout the frames of a video stream. In one example, the ASOR data structure 242 includes a Stream ID data field that identifies a video stream. In this example, the ASOR data structure 242 includes the following data fields for each frame in the video stream: Frame ID (e.g., an identifier of the frame, such as a frame number); Object ID (e.g., an identifier of an object in the frame); Object Type (e.g., a determined type of an object in the frame); Object Position List (e.g., data defining a spatial location of the object in the frame, such as coordinates); Object Temperature (e.g., determined temperature of the object in the frame); Environment Temperature (e.g., temperature of the environment in the frame); Wind Direction (e.g., direction of wind of the environment in the frame); Wind Speed (e.g., velocity of wind of the environment in the frame); Time Stamp (e.g., date and time of the frame); Context (e.g., location, activities); and Priority Score (e.g., a determined numeric score of a priority of the object). Examples of the ASOR data structure 242 are shown in FIGS. 8 and 9, described below.

In embodiments, the ASOR criteria 244 includes criteria that define how the user 220 wants to prioritize and filter the objects in the displayed output of the visual enhancement device 205. An example of criteria is highlighting or hiding an object based on whether the object is moving or stationary. Another example or criteria is highlighting or hiding an object based on whether the object has a temperature that exceeds a threshold temperature. Implementations are not limited to these examples of criteria, and other criteria may be used. In embodiments, the ASOR criteria 244 may also include user-defined priorities that the system uses in selecting a most important object after the objects have been prioritized. The criteria may be defined by the user 220.

In embodiments, the user profile 246 includes data that defines system preferences of the user 220 for the environment. The user profile 246 may be defined by the user 220.

In embodiments, the interested object list 248 includes data that defines a selection of classifications (e.g., types) of objects the user 220 is interested in highlighting or removing. In one example, the interested object list 248 is a subset of possible classifications used by the ASOR code 200 to classify objects in a frame of the video stream. For example, the ASOR code 200 might be able to classify an object as one of a person, animal, coyote, cow, car, and the interested object list 248 is the user-defined selection of a subset of these classifications (e.g., coyote). The interested object list 248 may be defined by the user 220. The classifications may have relations. For example, the classifications coyote and cow may each be related to the classification animal, e.g., as sub-level classifications of a higher-level classification. In this manner, a user may specify the higher-level classification in the interested object list 248 to indicate an interest in all the sub-level classifications under that particular higher-level classification.

With continued reference to FIG. 2, in embodiments the ASOR server 230 comprises an information collector module 250, ASOR identifier module 252, ASOR classifier module 254, ASOR prioritizer module 256, and ASOR selector module 258, each of which may comprise modules of the ASOR code 200. These modules of the ASOR code 200 are executable by the processing circuitry 120 of FIG. 1 to perform aspects of the inventive methods as described herein. The ASOR server 230 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In an exemplary client-server implementation, the ASOR server 230 is separate from the visual enhancement device 205, and the two communicate over a network such as the WAN 102 of FIG. 1. In another exemplary implementation represented by the dashed line box in FIG. 2, the visual enhancement device 205' includes the ASOR code 200 and the ASOR manager 235, and there is no separate ASOR server 230. The following description of the functions of the modules 250, 252, 254, 256, 258 applies to both implementations except where otherwise indicated.

In accordance with aspects of the invention, the information collector module 250 is configured to receive information from the visual enhancement device 205. In embodiments, the information collector module 250 receives a video stream from the visual enhancement device 205. The video stream may be received in real time, near real time, or during post processing. In this context, the video stream comprises digital video data obtained or received by the visual enhancement device 205 from one or more camera devices. For example, the visual enhancement device 205 may include a digital camera device that collects video of a real-world environment including the objects 210*a-n*, and the video stream is the digital video data from that digital camera device. In a client-server implementation, the information collector module 250 receives the data via network communication between the visual enhancement device 205 and the ASOR server 230. In a non-client-server implementation, the information collector module 250 receives the data via another module or component of the visual enhancement device 205.

In embodiments, the information collector module 250 also receives context data in the form of IoT device data from the one or more IoT sensors 225*a-m*. The one or more IoT sensors 225*a-m* may comprise any number of conventional or later-developed IoT sensors that generate sensor data and make that data available to other devices, e.g., via a publish and subscribe model (also called a publish/subscribe pattern) in an IoT network. The IoT sensors 225*a-m* may collect data including but not limited to object temperature data, environment temperature data, wind direction and speed data, location data, proximity data, position data, motion data, and camera data. The IoT sensors 225*a-m* may comprise fixed location devices that collect data in the vicinity of the visual enhancement device 205. Examples of fixed location devices include but are not limited to: video cameras; thermal cameras; proximity sensors; position sensors; motion sensors; wind speed and direction sensors; and environmental temperature sensors. Each of these devices may collect data about the environment and/or objects in the environment and publish this data to an IoT network. The IoT sensors 225*a-m* may additionally or alternatively comprise mobile devices that collect data in the vicinity of the visual enhancement device 205. Such mobile devices can include a smartphone or similar device that publishes data (e.g., location, speed, etc.) to subscribing devices in the IoT network. Such mobile devices can include one or more sensors integrated in vehicle, where the vehicle publishes data (e.g., location, speed, etc.) to subscribing devices in the IoT network. In embodiments, each IoT sensor that provides IoT device data also provides a location of the IoT sensor itself, so that the system can determine whether the IoT sensor, and its data, is within the vicinity of the visual enhancement device 205 by comparing the location of the IoT sensor to the location of the visual enhancement device 205. In one example, the visual enhancement device 205 is the subscribing device to the IoT network and the information collector module 250 obtains the IoT device data from the visual enhancement device 205. In another example, the ASOR server 230 is the subscribing device, and the information collector module 250 obtains the IoT device data from the IoT network.

In accordance with aspects of the invention, the ASOR identifier module 252 is configured to identify objects in a frame of the video stream of the visual enhancement device 205 obtained by the information collector module 250. In embodiments, the ASOR identifier module 252 identifies objects in a frame using one or more techniques such as edge detection, which is technique used in image processing, machine vision, and computer vision for finding the boundaries of objects within images.

In accordance with aspects of the invention, the ASOR classifier module 254 is configured to classify the objects identified by the ASOR identifier module 252. In embodiments, classifying an object comprises associating a predefined type (e.g., person, animal, coyote, cow, car) with the object based on the visual appearance of the object in the frame. In embodiments, the ASOR classifier module 254 uses techniques such as region-based convolutional neural network (R-CNN) or you only look once (YOLO), for example, to classify the identified objects in a frame of the video stream.

In embodiments, the functions of the ASOR identifier module 252 and the ASOR classifier module 254 may be performed together using a comprehensive technique. An example of one such technique is object recognition, which is a computer vision technique used to identify, locate, and classify objects in digital images.

In accordance with aspects of the invention, the ASOR prioritizer module 256 is configured to prioritize the classified objects based on the ASOR criteria 244 and, optionally, the interested object list 248. In embodiments, the prioritizing comprises determining which of the identified objects satisfy the ASOR criteria 244 and have a type (e.g., classification) that is included in the interested object list 248. In embodiments, the ASOR prioritizer module 256 determines that an object satisfies the ASOR criteria 244 using the IoT device data collected by the information collector module 250. In implementations, the system determines one or more attributes of an object using the IoT device data and compares these one or more attributes to the ASOR criteria 244 to determine whether the object satisfies the ASOR criteria 244. In embodiments, the ASOR prioritizer module 256 determines whether an object has a type included in the interested object list 248 by comparing the type each object (i.e., as determined by the ASOR classifier module 254) to the one or more types defined in the interested object list 248. In this manner, the ASOR prioritizer module 256 may determine a subset of objects in a frame of the video stream, where the subset includes only those objects that (i) satisfy the ASOR criteria 244 and (ii) have a type (e.g., classification) that is included in the interested object list 248.

In an illustrative example, a frame of the video stream is determined to have four objects including two objects classified as person, one object classified as car, and one object classified as cow. In this example, the interested object list 248 includes data that defines ‘person’ as a type of object this user is interested in. In this example, the ASOR criteria 244 defines the criteria as ‘highlight stationary objects.’ In this example, the ASOR prioritizer module 256 determines that the two objects classified as person match the object type defined in the interested object list 248. In this example, the ASOR prioritizer module 256 determines, using the IoT device data, that a first one of the objects classified as person is moving and that a second one of the objects classified as person is stationary. In this example, the ASOR prioritizer module 256 determines a subset that includes only the second one of the objects classified as person, since this object is the only one of the four objects in the frame that satisfies both the interested object list 248 and the ASOR criteria 244.

In embodiments, when plural objects satisfy both the interested object list 248 and the ASOR criteria 244, the ASOR prioritizer module 256 may rank these objects in a prioritized ranking. In one example, the ASOR prioritizer module 256 determines a priority score for each of the objects and ranks the objects according to the respective priority scores. The priority score may be determined using a predefined scoring system or formula. One example is adding predefined numbers of points for object attributes that satisfy the ASOR criteria 244 and subtracting predefined numbers of points for object attributes that do not satisfy the ASOR criteria 244. Other formulas may be used for determining respective priority scores for the objects based on their object attributes, which are determined from the IoT device data and stored in the ASOR data structure in embodiments.

In some situations, the interested object list 248 may be empty. For example, the user 220 may not have specified any object types for inclusion in the interested object list 248. In embodiments, the ASOR prioritizer module 256 handles this situation by deeming that all objects in the frame satisfy the interested object list 248. In this manner, the prioritizing performed by the ASOR prioritizer module 256 comprises determining which objects in the frame of the video stream satisfy the ASOR criteria 244, since all objects are deemed to satisfy the interested object list 248.

In accordance with aspects of the invention, the ASOR selector module 258 is configured to select one or more of the prioritized objects determined by the ASOR prioritizer module 256. In implementations, the ASOR selector module 258 selects the top ranked object when plural objects are ranked according to priority score as described above. In implementations, when only one object satisfies both the interested object list 248 and the ASOR criteria 244, the ASOR selector module 258 selects this one object. In accordance with aspects of the invention, the selecting further comprises determining an area of the frame that corresponds to the selected object. In embodiments, the ASOR selector module 258 uses one or more of a Sobel operator technique, magic wand selection, and edge extraction to determine the area of the frame that corresponds to the selected object. Other techniques may be used.

With continued reference to FIG. 2, in embodiments the visual enhancement device 205 includes an ASOR filter module 260 and an ASOR render module 262. In embodiments, these modules comprise portions of code of the visual enhancement device 205 that is executable by the processing circuitry of the visual enhancement device 205 to perform aspects of the inventive methods as described herein. The visual enhancement device 205 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the ASOR filter module 260 is configured to enhance a frame of the video stream by highlighting and/or hiding objects in the frame based on the output of the ASOR selector module 258. In one example, the ASOR filter module 260 highlights the object selected by the ASOR selector module 258 and does not alter the objects not selected by the ASOR selector module 258. In another example, the ASOR filter module 260 hides all objects in the frame that are not selected by the ASOR selector module 258 and does not alter the object selected by the ASOR selector module 258. In another example, the ASOR filter module 260 highlights the object selected by the ASOR selector module 258 and hides the objects not selected by the ASOR selector module 258. In embodiments, highlighting an object comprises altering the frame of the video stream to add visual enhancement on and/or around the area occupied by the object, the area having been determined by the ASOR selector module 258 as described herein. Non-limiting examples of visual enhancement include: adding a colorful line around the boundary of the object; adding a glow effect around the boundary of the object; increasing one or more of the brightness and contrast in the area of the object. These and/or other visual enhancements may be applied to the frame using conventional or later-developed image processing techniques. In embodiments, hiding an object comprises altering the frame of the video stream to remove or obscure the object in the frame. Hiding an object in this manner may be performed using conventional or later-developed image processing techniques, e.g., such as inpainting.

In accordance with aspects of the invention, the ASOR render module 262 is configured to render the enhanced frame of the video stream on the display 215. In embodiments, this rendering causes the display 215 to output a visual display of that includes the enhanced frame of the video stream, wherein the enhanced frame is altered with the highlighting and/or hiding of one or more of the objects in the frame based on the output of the ASOR filter module 260. In this manner, the user 220 sees on the display 215 an enhanced version of the frame of the video stream, the enhancement comprising the highlighting and/or hiding of one or more objects in the frame based on a combination of the user's input (i.e., from the interested object list 248 and the ASOR criteria 244) and the IoT device data (i.e., from one or more IoT sensors 225*a-m*).

Figure 3A:
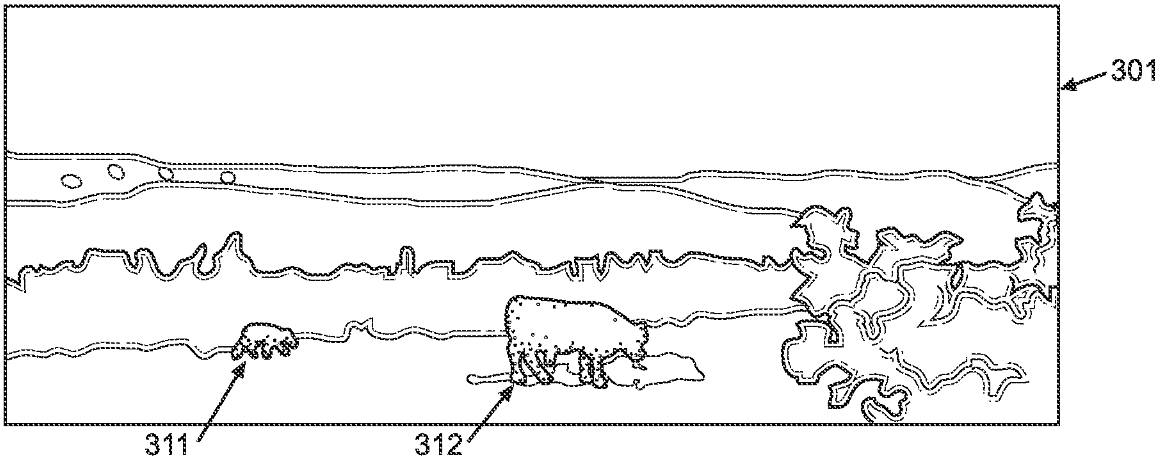
FIGS. 3A-C show examples of frames of a video stream in accordance with aspects of the invention.
Figure 3B:
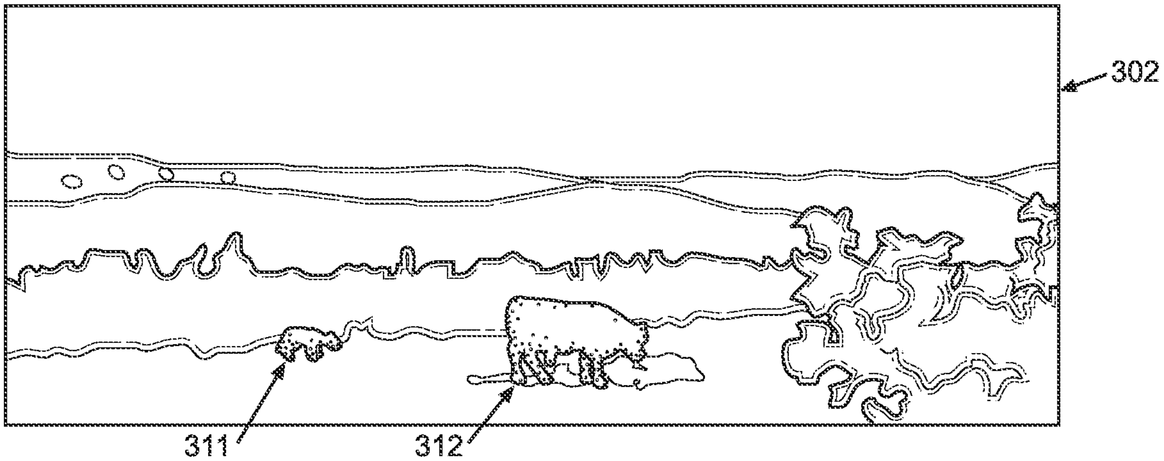
Figure 3C:
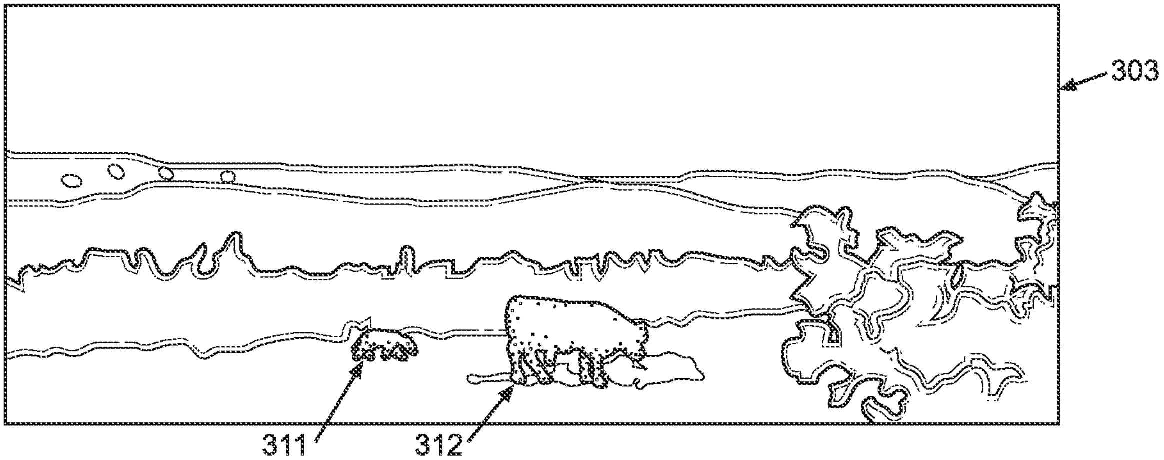

FIGS. 3A-C show examples of original (e.g., not enhanced) frames of a video stream from a visual enhancement device such as visual enhancement device 205. FIG. 3A shows a first frame 301 at time t1. FIG. 3B shows a second frame 302 at time t2 after time t1. And FIG. 3C shows a third frame 303 at time t3 after time t2. Each frame 301, 302, 303 includes a first object 311 and a second object 312. In this example, the first object 311 is a coyote and the second object 312 is a cow.

Figure 4A:
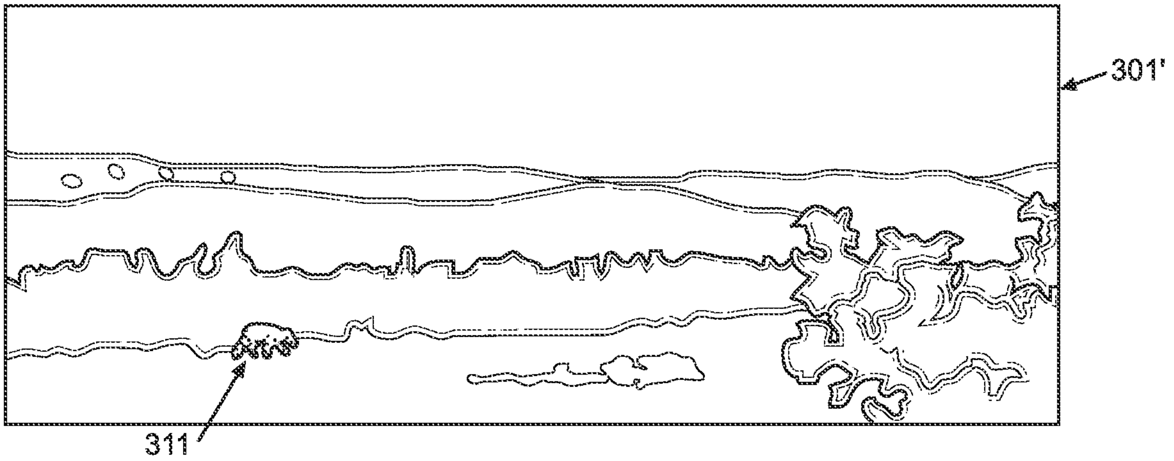
FIGS. 4A-C show an example of enhanced frames of a video stream in accordance with aspects of the invention.
Figure 4B:
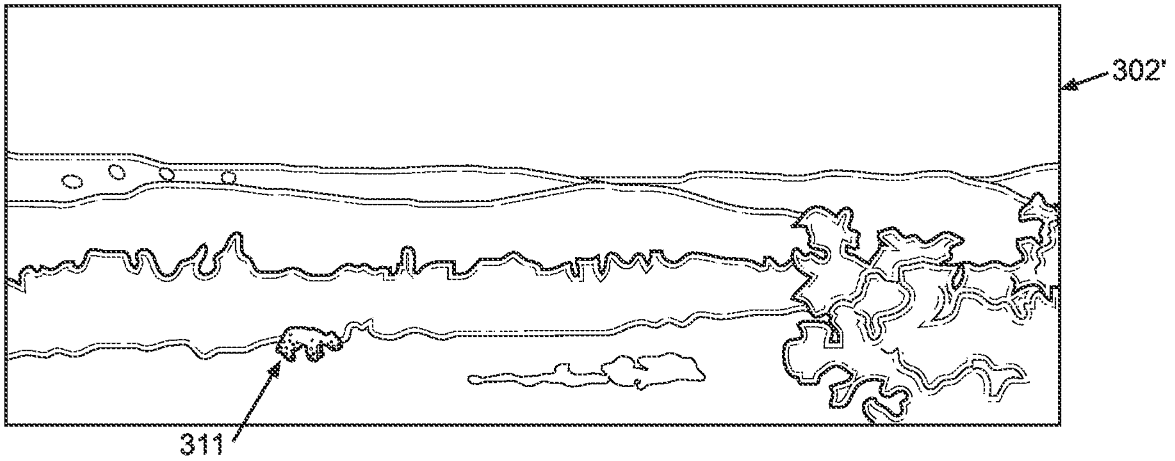
Figure 4C:
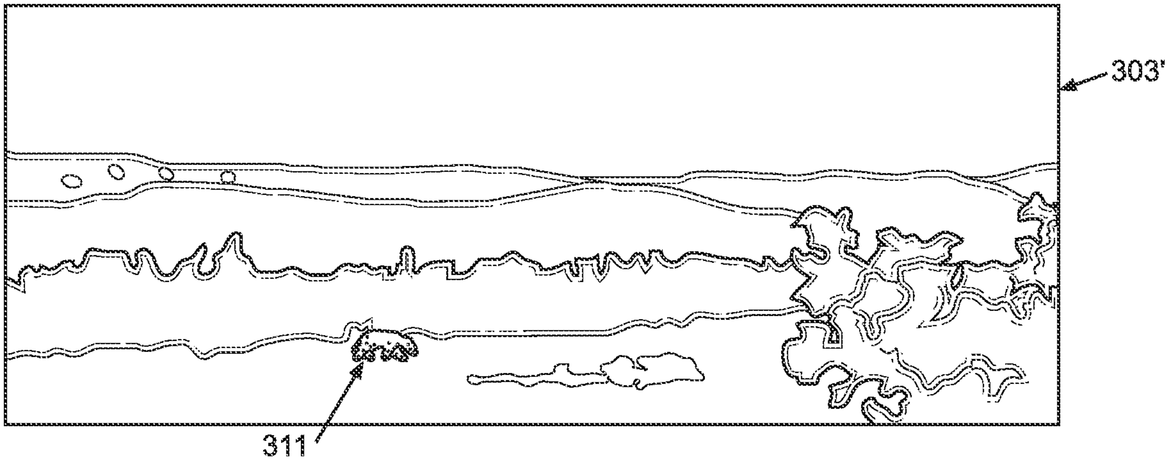

FIGS. 4A-C show a first example of an enhanced frames 301', 302', and 303' that result from enhancing the frames 301, 302, 303 of FIGS. 3A-C. In this first example, the ASOR identifier module 252 identifies the objects in the frames, the ASOR classifier module 254 classifies the identified objects (e.g., as coyote and cow), the ASOR prioritizer module 256 prioritizes the objects according based on the ASOR criteria 244 and the interested object list 248. In this example, the ASOR criteria 244 includes the criteria 'moving' and the interested object list 248 includes the type 'coyote'. In this example, the ASOR prioritizer module 256 determines from the context data that the first object 311 is moving and that the second object 312 is stationary. The context data may be obtained from one or more IoT sensors 225*a-m* comprising motion sensors and/or proximity sensors, for example. In this example, the ASOR prioritizer module 256 determines that the first object 311 satisfies both the ASOR criteria 244 (i.e., 'moving') and the interested object list 248 (i.e., 'coyote'), and that the second object 312 does not satisfy both the ASOR criteria 244 (i.e., 'moving') and the interested object list 248 (i.e., 'coyote'). The subset of prioritized objects thus includes only the first object 311. Continuing this example, the ASOR selector module 258 selects the top object from the subset of prioritized objects, which is the first object 311 in this case. The ASOR filter module 260 then enhances the frames by hiding the second object 312 in each of the frames 301', 302', 303'. For example, the ASOR criteria 244 or user profile 246 may contain data that instructs the system to hide non-selected objects. The ASOR render module 262 then causes the display 215 to display the enhanced frames 301', 302', 303'.

Figure 5A:
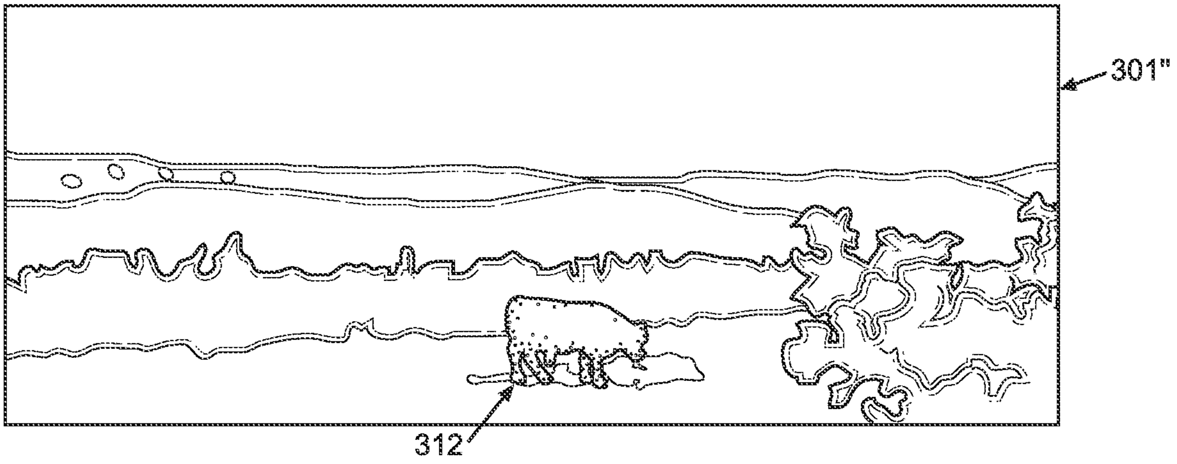
FIGS. 5A-C show another example of enhanced frames of a video stream in accordance with aspects of the invention.
Figure 5B:
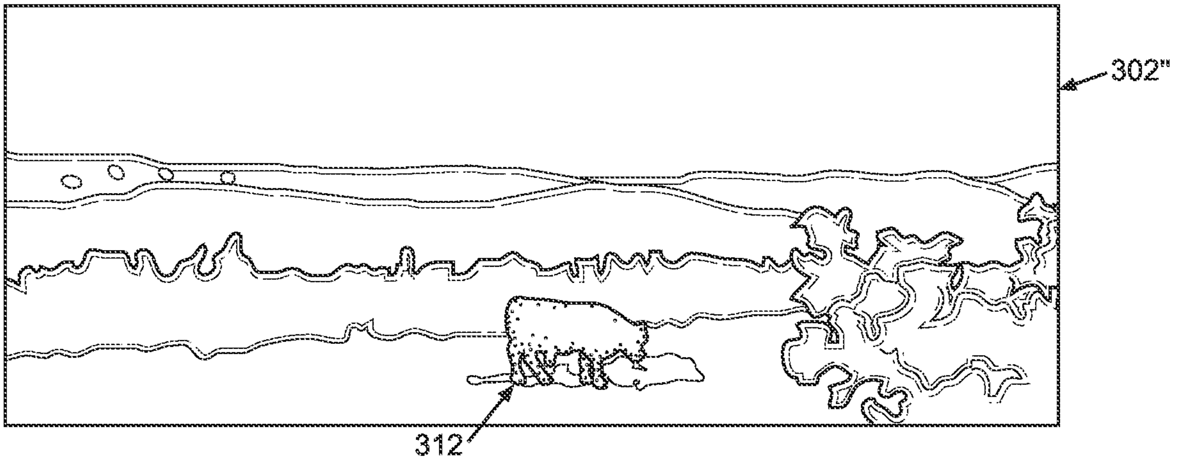
Figure 5C:
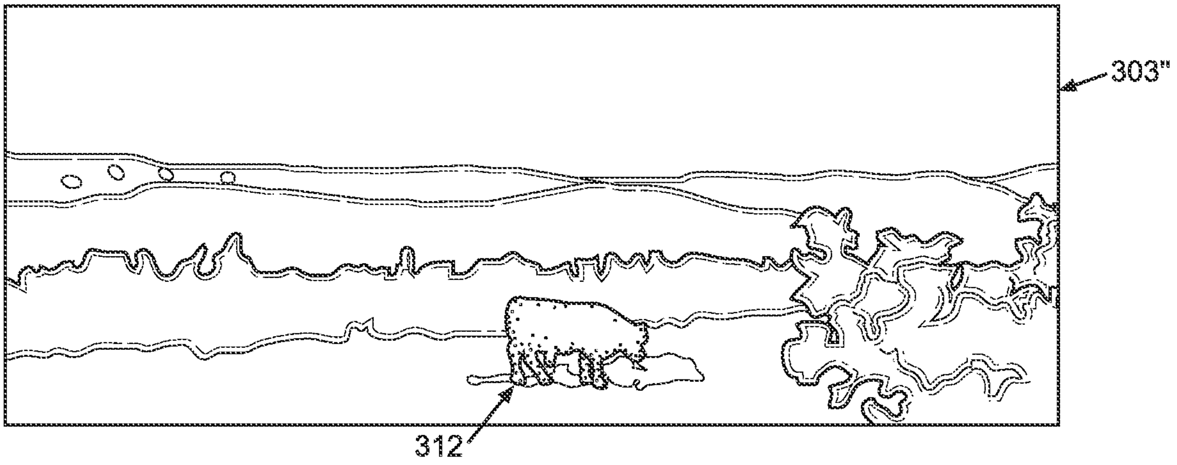

FIGS. 5A-C show a second example of an enhanced frames 301", 302", and 303" that result from enhancing the frames 301, 302, 303 of FIGS. 3A-C. In this second example, the ASOR identifier module 252 identifies the objects in the frames, the ASOR classifier module 254 classifies the identified objects (e.g., as coyote and cow), the ASOR prioritizer module 256 prioritizes the objects according based on the ASOR criteria 244 and the interested object list 248. In this example, the ASOR criteria 244 includes the criteria 'stationary' and the interested object list 248 is empty (NULL), meaning that the user has not defined any objects of interest. In this example, the ASOR prioritizer module 256 determines from the context data that the first object 311 is moving and that the second object 312 is stationary. The context data may be obtained from one or more IoT sensors 225*a-m* comprising motion sensors and/or proximity sensors, for example. In this example, the ASOR prioritizer module 256 determines that the second object 312 satisfies both the ASOR criteria 244 (i.e., 'stationary') and the interested object list 248 (i.e., NULL), and that the first object 311 does not satisfy both the ASOR criteria 244 (i.e., 'stationary') and the interested object list 248 (i.e., NULL). The subset of prioritized objects thus includes only the second object 312. Continuing this example, the ASOR selector module 258 selects the top object from the subset of prioritized objects, which is the second object 312 in this case. The ASOR filter module 260 then enhances the frames by hiding the first object 311 in each of the frames 301". 302", 303". For example, the ASOR criteria 244 or user profile 246 may contain data that instructs the system to hide non-selected objects. The ASOR render module 262 then causes the display 215 to display the enhanced frames 301", 302", 303".

Figure 6:
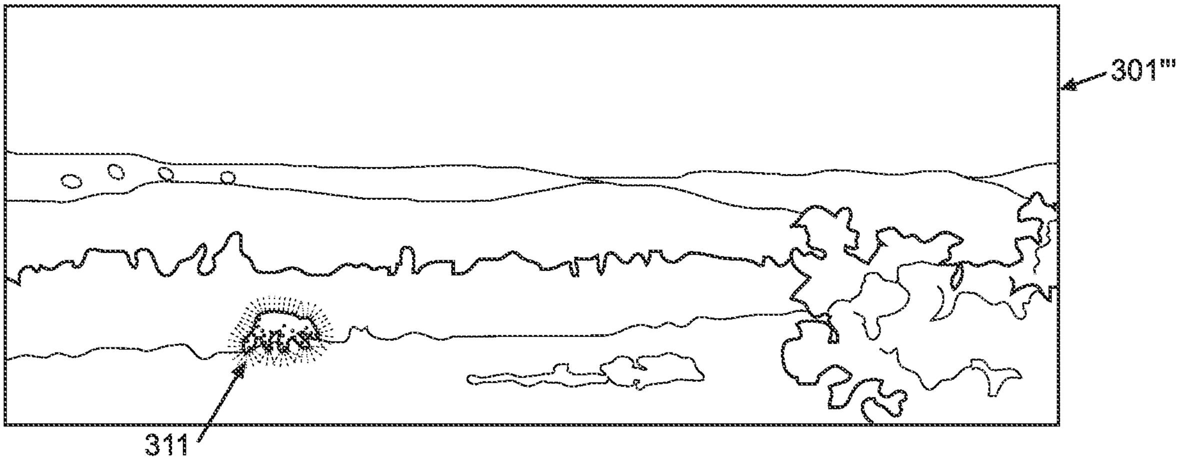
FIG. 6 shows another example of an enhanced frame of a video stream in accordance with aspects of the invention.

FIG. 6 shows another example of an enhanced frame 301'". In this example, the selected object (i.e., the first object 311) is enhanced with a glow or highlight effect, and the not selected object (i.e., the second object 312) is hidden.

Figure 7A:
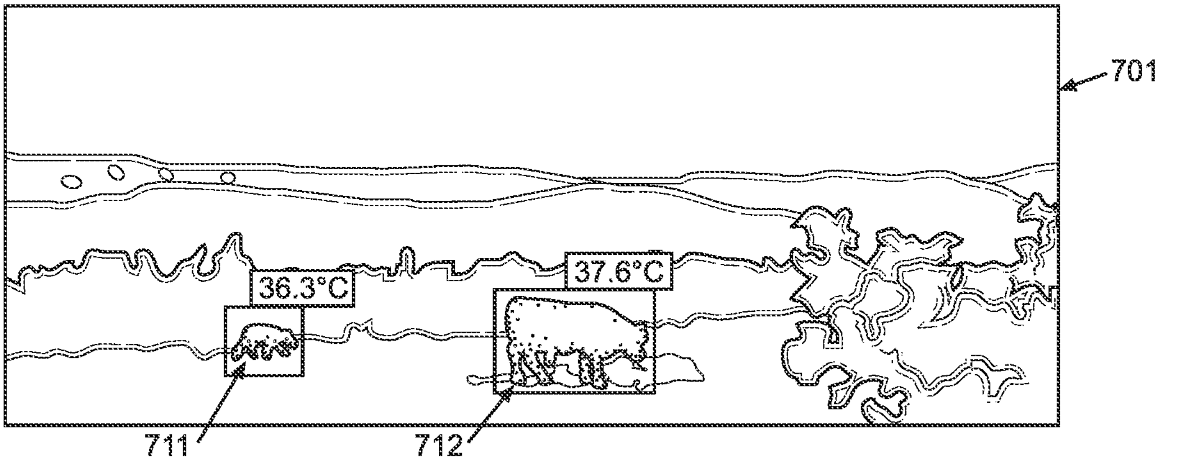
FIGS. 7A and 7B show an example of an original frame and an enhanced frame of a video stream in accordance with aspects of the invention.

FIG. 7A shows another example of an original (e.g., not enhanced) frame of a video stream from a visual enhancement device such as visual enhancement device 205. FIG. 7A shows a frame 701 that includes a first object 711 and a second object 712. In this example, the first object 711 is an animal and the second object 712 is an animal.

Figure 7B:
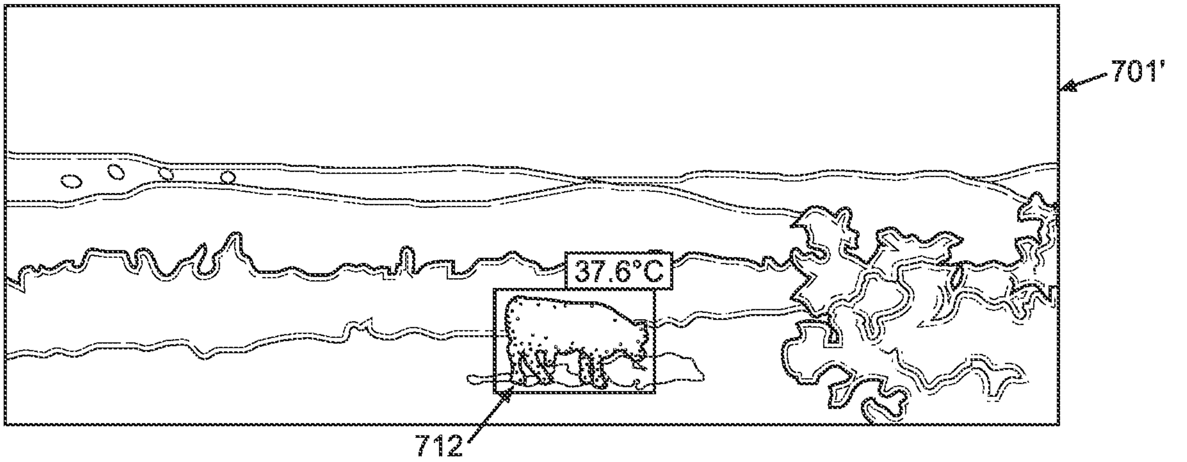

FIG. 7B shows an example of an enhanced frame 701' that results from enhancing the frames 701 of FIG. 7A. In this example, the ASOR identifier module 252 identifies the objects in the frames, the ASOR classifier module 254 classifies the identified objects (e.g., as animal and animal), the ASOR prioritizer module 256 prioritizes the objects according based on the ASOR criteria 244 and the interested object list 248. In this example, the ASOR criteria 244 includes the criteria 'highest object temperature' and the interested object list 248 includes the type 'animal'. In this example, the ASOR prioritizer module 256 determines from the context data that the first object 711 has an object temperature of 36.3° C. and that the second object 712 has an object temperature of 37.6° C. This context data may be obtained by one or more IoT sensors 225*a-m*, such as one or more thermal cameras that detect the temperature of objects. In this example, the ASOR prioritizer module 256 determines that the first object 312 satisfies both the ASOR criteria 244 (i.e., 'highest object temperature') and the interested object list 248 (i.e., 'animal'), and that the second object 312 does not satisfy both the ASOR criteria 244 (i.e., 'highest object temperature') and the interested object list 248 (i.e., 'animal'). The subset of prioritized objects thus includes only the second object 712. Continuing this example, the ASOR selector module 258 selects the top object from the subset of prioritized objects, which is the second object 712 in this case. The ASOR filter module 260 then enhances the frames by hiding the first object 711 in the frame 701'. For example, the ASOR criteria 244 or user profile 246 may contain data that instructs the system to hide non-selected objects. The ASOR render module 262 then causes the display 215 to display the enhanced frame 701'.

FIG. 8 shows an exemplary data structure 800 corresponding to the ASOR data structure 244 for the example of FIGS. 3A-C. In this example, the data structure 800 includes columns for data including time stamp 801, Stream ID 802, Frame ID 803, Object ID 804, Object type 805, Object position list 806, Object temperature 807, Environment temperature 808, Wind direction 809, Wind speed 810, Location 811, Activity 812, and Priority score 813. In this example, the data structure 800 includes one row per object per frame of the video stream. In this example, columns 807-812 are populated using context data from the one or more IoT sensors 225*a-m*.

FIG. 9 shows an exemplary data structure 900 corresponding to the ASOR data structure 244 for the example of FIGS. 7A-B. In this example, the data structure 900 includes columns for data including time stamp 901, Stream ID 902, Frame ID 903, Object ID 904, Object type 905, Object position list 906, Object temperature 907, Environment temperature 908, Wind direction 909, Wind speed 910, Location 911, Activity 912, and Priority score 913. In this example, the data structure 900 includes one row per object per frame of the video stream. In this example, columns 907-912 are populated using context data from the one or more IoT sensors 225*a-m*.

In accordance with additional aspects of the invention, the system may use the data in the object position list column (e.g., 806 or 906) to determine whether an object is moving or stationary. In embodiments, the ASOR prioritizer module 256 analyzes the positions of the objects from one frame to the next and determines that the object is moving if its position changes from frame to frame and determines that the object is stationary if its position remains the same from frame to frame. This determination may be used to confirm an indication in the context data that an object is moving or stationary.

Figure 10:
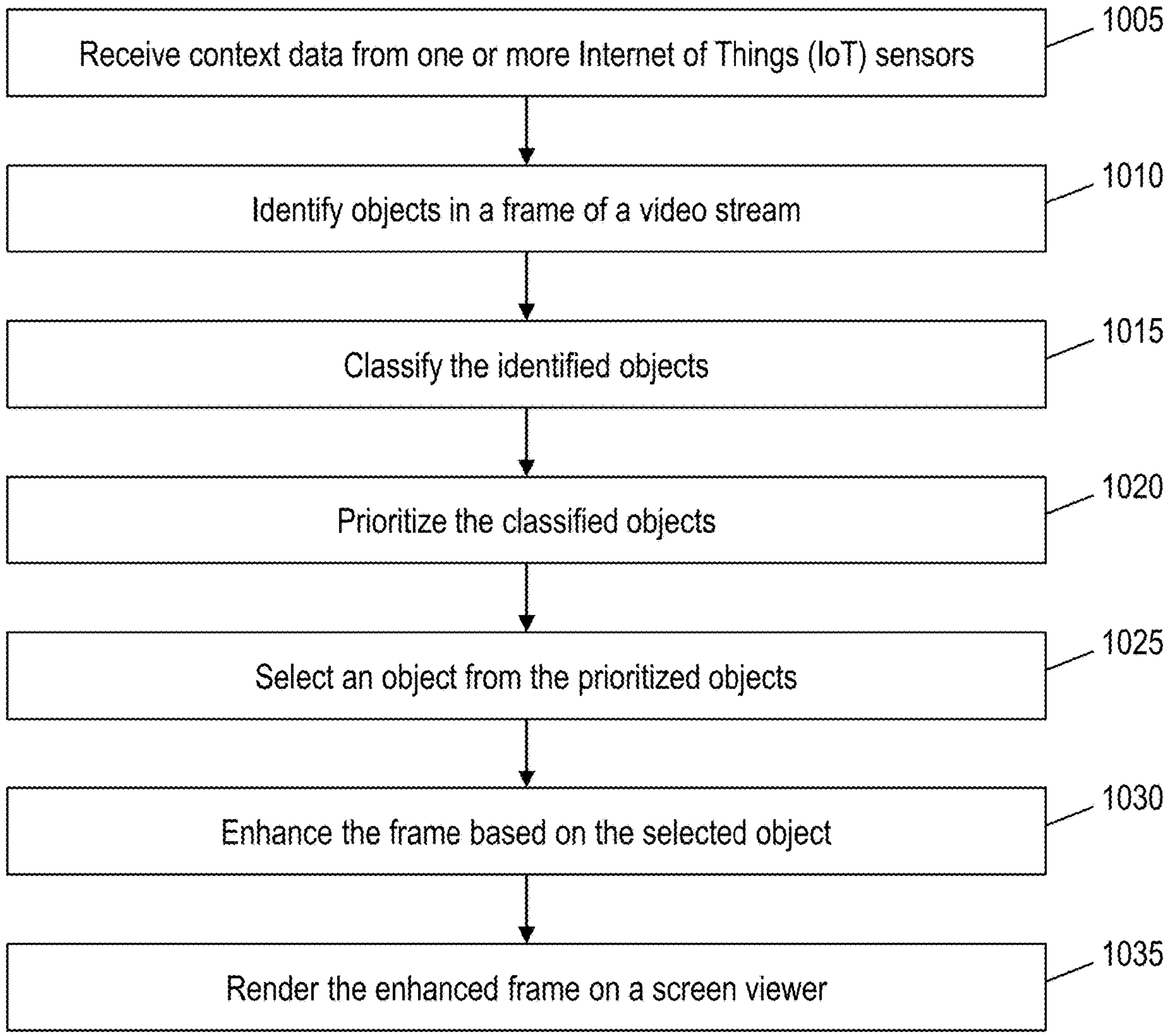
FIG. 10 shows a flowchart of an exemplary method in accordance with aspects of the invention.

FIG. 10 shows a flowchart of an exemplary method in accordance with aspects of the present invention. Steps of the method may be carried out in the environment of FIG. 2 and are described with reference to elements depicted in FIG. 2.

At step 1005, the system receives context data from one or more Internet of Things (IoT) sensors. In embodiments, and as described with respect to FIG. 2, the information collector module 250 receives context data in the form of IoT device data from the one or more IoT sensors 225*a-m* in an IoT network.

At step 1010, the system identifies one or more objects in a frame of a video stream, thereby determining identified objects. In embodiments, and as described with respect to FIG. 2, ASOR identifier module 252 identifies objects in a frame of a video stream of the visual enhancement device 205.

At step 1015, the system classifies the identified objects, thereby determining classified objects. In embodiments, and as described with respect to FIG. 2, the ASOR classifier module 254 classifies the objects that were identified at step 1010.

At step 1020, the system prioritizes the classified objects using the context data, thereby determining prioritized objects. In embodiments, and as described with respect to FIG. 2, the ASOR prioritizer module 256 prioritizes the objects that were classified at step 1015.

At step 1025, the system selects an object from the prioritized objects. In embodiments, and as described with respect to FIG. 2, the ASOR selector module 258 selects an object from the prioritized objects determined at step 1020.

At step 1030, the system enhances the frame of the video stream based on the selected object. In embodiments, and as described with respect to FIG. 2, the ASOR filter module 260 enhances the frame by highlighting the selected object and/or hiding objects other than the selected object.

At step 1035, the system renders the enhanced frame on a display of a visual enhancement device. In embodiments, and as described with respect to FIG. 2, the ASOR render module 262 causes the display 215 to display the enhanced frame from step 1030.

Still referring to the method of FIG. 10, and as described with respect to FIG. 2, the prioritizing may be based on criteria defined by a user in the ASOR criteria 244. The prioritizing may additionally be based on one or more object types defined by the user in the interested object list 258. In this manner, the prioritizing provides a way to determine an object in the frame that is most important to the user.

Still referring to the method of FIG. 10, and as described with respect to FIG. 2, the enhancing the frame may comprise one of: highlighting the selected object; hiding objects other than the selected object; and highlighting the selected object and hiding objects other than the selected object.

Still referring to the method of FIG. 10, and as described with respect to FIG. 2, the context data may comprise one or more selected from a group consisting of: object temperature; environment temperature; wind speed and direction; object location; object speed; and activity. The context data may be stored in an ASOR data structure 242 that defines object attributes for plural frames of the video stream.

Still referring to the method of FIG. 10, and as described with respect to FIG. 2, the prioritizing may comprise determining respective priority scores for each of the prioritized objects, and the selecting may be based on the priority scores.

Figure 11:
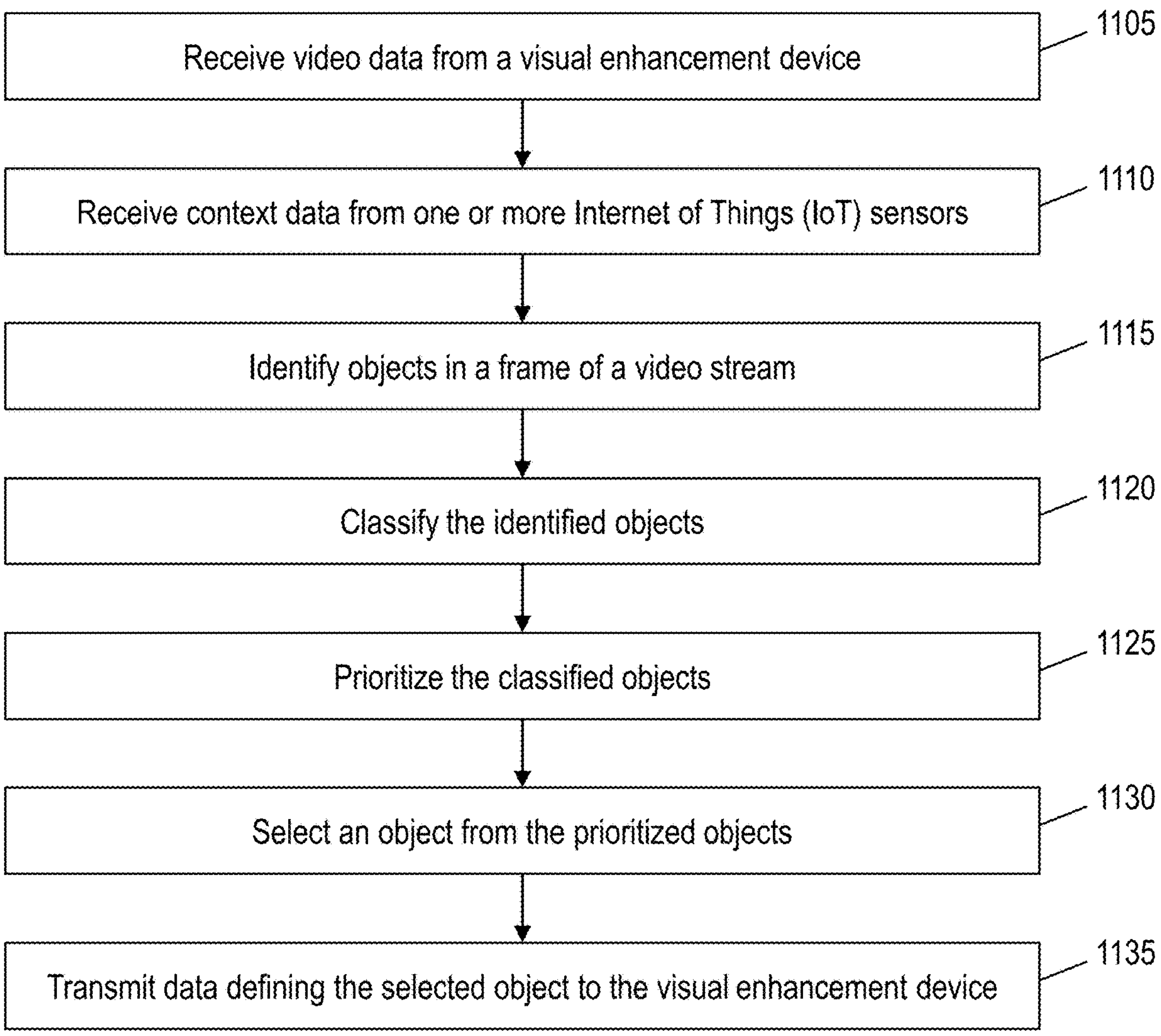
FIG. 11 shows a flowchart of an exemplary method in accordance with aspects of the invention.

FIG. 11 shows a flowchart of an exemplary method in accordance with aspects of the present invention. Steps of the method may be carried out in the environment of FIG. 2 and are described with reference to elements depicted in FIG. 2.

At step 1105, the ASOR server 230 receives video data from the visual enhancement device 205. The video data may include a portion of a video stream as described herein. At step 1110, the ASOR server 230 receives context data from one or more Internet of Things (IoT) sensors. At step 1115, the ASOR server 230 identifies one or more objects in a frame of a video stream, thereby determining identified objects. At step 1120, the ASOR server 230 classifies the identified objects, thereby determining classified objects. At step 1125, the ASOR server 230 prioritizes the classified objects using the context data, thereby determining prioritized objects. At step 1130, the ASOR server 230 selects an object from the prioritized objects. Steps 1115, 1120, 1125, and 1130 may be performed in the same manner as steps 1010, 1015, 1020, and 1025 described above with respect to FIG. 10. At step 1135, the ASOR server 230 transmits data defining the selected object to the visual enhancement device 205. In embodiments, the transmitting comprises transmitting a frame ID and a stream ID associated with the data defining the selected object. In this manner, the visual enhancement device 205 is notified of which object to enhance in which frame or a particular video stream. In this manner, the ASOR server 230 provides the visual enhancement device 205 with the data on which the filtering and rendering will be based when the filtering and rendering are performed by the visual enhancement device 205.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, by a processor set, context data from one or more Internet of Things (IoT) sensors, the context data comprising one or more selected from a group consisting of: object temperature; environment temperature; wind speed and direction; object location; object speed; and activity;

identifying, by the processor set, one or more objects in a frame of a video stream, thereby determining identified objects;

classifying, by the processor set, the identified objects, thereby determining classified objects;

prioritizing, by the processor set, the classified objects using the context data, thereby determining prioritized objects;

selecting, by the processor set, an object from the prioritized objects;

enhancing, by the processor set, the frame of the video stream based on the selected object; and rendering, by the processor set, the enhanced frame on a display of a visual enhancement device.

2. The method of claim 1, wherein the prioritizing is based on criteria defined by a user.

3. The method of claim 2, wherein the prioritizing is based on one or more object types defined by the user.

4. The method of claim 1, wherein the enhancing the frame comprises highlighting the selected object.

5. The method of claim 1, wherein the enhancing the frame comprises hiding objects other than the selected object.

6. The method of claim 1, wherein the enhancing the frame comprises highlighting the selected object and hiding objects other than the selected object.

7. The method of claim 1, further comprising storing the context data in a data structure that defines object attributes for plural frames of the video stream.

8. The method of claim 1, further comprising determining respective priority scores for each of the prioritized objects, and wherein the selecting is based on the priority scores.

9. A computer program product comprising one or more computer readable storage media having program instructions collectively stored on the one or more computer readable storage media, the program instructions executable to:

receive context data from one or more Internet of Things (IoT) sensors, the context data comprising one or more selected from a group consisting of: object temperature; environment temperature; wind speed and direction; object location; object speed; and activity;

identify one or more objects in a frame of a video stream, thereby determining identified objects;

classify the identified objects, thereby determining classified objects;

prioritize the classified objects using the context data, thereby determining prioritized objects;

select an object from the prioritized objects;

enhance the frame of the video stream based on the selected object; and render the enhanced frame on a display of a visual enhancement device.

10. The computer program product of claim 9, wherein the prioritizing is based on criteria defined by a user.

11. The computer program product of claim 10, wherein the prioritizing is based on one or more object types defined by the user.

12. The computer program product of claim 9, wherein the enhancing the frame comprises one or more selected from a group consisting of: highlighting the selected object; and hiding objects other than the selected object.

13. The computer program product of claim 9, wherein the program instructions are executable to store the context data in a data structure that defines object attributes for plural frames of the video stream.

14. The computer program product of claim 9, wherein:

the program instructions are executable to determine respective priority scores for each of the prioritized objects; and the selecting is based on the priority scores.

15. A system comprising:

a processor set, one or more computer readable storage media, and program instructions collectively stored on the one or more computer readable storage media, the program instructions executable to:

receive video data from a visual enhancement device;

receive context data from one or more Internet of Things (IoT) sensors, the context data comprising one or more selected from a group consisting of: object temperature; environment temperature; wind speed and direction; object location; object speed; and activity;

identify one or more objects in a frame of a video stream of the video data, thereby determining identified objects;

classify the identified objects, thereby determining classified objects;

prioritize the classified objects using the context data, thereby determining prioritized objects;

select an object from the prioritized objects; and transmit data defining the selected object to the visual enhancement device.

16. The system of claim 15, wherein the prioritizing is based on a combination of user input and the context data.

17. The system of claim 15, wherein:

the program instructions are executable to store the context data in a data structure that defines object attributes for plural frames of the video stream.

18. The system of claim 15, wherein:

the program instructions are executable to determine respective priority scores for each of the prioritized objects; and the selecting is based on the priority scores.

* * * * *